US012705815B2

(12) United States Patent
Sang et al.

(10) Patent No.: US 12,705,815 B2
(45) Date of Patent: Aug. 11, 2026

(54) SOFTWARE GRAPHICS RENDERING

(71) Applicant: HUAWEI TECHNOLOGIES CO., LTD., Shenzhen (CN)

(72) Inventors: Guoan Sang, Markham (CA); Yang Liu, Toronto (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 255 days.

(21) Appl. No.: 18/474,485

(22) Filed: Sep. 26, 2023

(65) Prior Publication Data

US 2025/0104324 A1 Mar. 27, 2025

(51) Int. Cl.
*G06T 15/00* (2011.01)
*G06F 9/30* (2018.01)
*G06F 9/455* (2018.01)

(52) U.S. Cl.
CPC ........ *G06T 15/005* (2013.01); *G06F 9/30105* (2013.01); *G06F 9/45516* (2013.01)

(58) Field of Classification Search
None
See application file for complete search history.

(56) References Cited

U.S. PATENT DOCUMENTS 7,542,042 B1 * 6/2009 Allen ....................... G09G 5/14 345/506
9,928,637 B1 * 3/2018 Corliss .................... G06T 15/80
10,459,688 B1 * 10/2019 Burgess .............. G06F 9/30025
2006/0225061 A1 * 10/2006 Ludwig ................. G06T 15/005 717/161
2012/0201467 A1 * 8/2012 Akenine-Moller ... G06T 15/005 382/199
2014/0095850 A1 * 4/2014 Plotnikov .............. G06F 8/452 712/241
2016/0379332 A1 * 12/2016 Krutsch .................... G06T 7/00 345/506
2019/0377706 A1 * 12/2019 Airaud .................. G06F 1/3287
2021/0174867 A1 * 6/2021 Phan ..................... G11C 11/419
2024/0111489 A1 * 4/2024 Kayiran .................. G06F 7/506

OTHER PUBLICATIONS

Kawakami et al., "A Binary Translator to Accelerate Development of Deep Learning Processing Library for AArch64 CPU"), Jun. 2022, IEICE Trans. Electron., vol. E105-C, No. 6, pp. 222-231 (Year: 2022).*

* cited by examiner

*Primary Examiner* — Andrew G Yang
(74) *Attorney, Agent, or Firm* — BCF LLP

(57) ABSTRACT

Graphics rendering systems and methods for rendering a 3D scene on a screen of a user device. 3D scene data representing a 3D scene is received by a CPU and processed through a graphics rendering pipeline in which graphics rendering instructions are executed by the CPU in a Single Instruction, Multiple Data (SIMD) approach, wherein multiple data elements of the SIMD approach are stored in and retrieved from an SVE register of the CPU. Pixel data resulting from the graphics rendering pipeline is stored in the frame buffer for output to the screen via a renderer.

19 Claims, 7 Drawing Sheets

SOFTWARE GRAPHICS RENDERING

FIELD

The present technology relates to graphics rendering; and in particular, to systems and methods for software graphics rendering using a Single Instruction, Multiple Data processing approach.

BACKGROUND

Graphics rendering is responsible for transforming three-dimensional (3D) scenes into two-dimensional (2D) images for display on various output devices. Generally, a graphics rendering pipeline includes stages such as vertex processing, primitive processing, fragment processing, and pixel operations to produce a final rendered image.

One example graphics rendering technique is that of SIMD (Single Instruction, Multiple Data) processing, which involves executing a single instruction on multiple data elements simultaneously. Within the context of SIMD, a 2×2 graphics rendering approach has been used. In this approach, a group of four adjacent pixels, forming a 2×2 block, is treated as a single processing unit. SIMD instructions are then applied to these blocks to achieve parallelism and to enhance processing speed.

The SIMD 2×2 graphics rendering technique efficiently handles key stages of the rendering pipeline. Vertex transformations, primitive assembly, and rasterization are optimized through SIMD processing, allowing for simultaneous operations on multiple vertices or fragments. Additionally, fragment processing, which encompasses operations like attribute interpolation, texture sampling, and shader processing, benefits from SIMD parallelism.

Software rendering is the process of generating an image from a model by means of computer software. In the context of computer graphics rendering, software rendering refers to a rendering process that is not dependent upon graphics hardware ASICs (application-specific integrated circuits), such as a graphics card. The rendering takes place entirely in the CPU (Central Processing Unit). Rendering with the (general-purpose) CPU has a main advantage that it is not restricted to the (limited) capabilities of graphics hardware, but the disadvantage is that more semiconductors are needed to obtain the same speed. CPU rendering has additional benefits such as not being constrained by the number of GPUs (Graphics processing Units), or the performance of the GPUs. CPU rendering works with system memory and is not limited to the size of GPU VRAM (Video Random-Access Memory).

In cloud systems, many users do not require heavy graphics rendering power. For example, for some office applications, sufficient performance is achieved without a dedicated GPU installed. CPU software graphics rendering remains widely used.

It is desirable to provide systems and methods that can enhance CPU rendering efficiency and overall performance whilst being compatible with existing applications requesting graphics rendering capabilities. Furthermore, other desirable features and characteristics of the present disclosure will become apparent from the subsequent detailed description and the appended claims, taken in conjunction with the accompanying drawings and the foregoing technical field and background.

SUMMARY

The present disclosure provides methods, systems and devices for overcoming at least some drawbacks present in prior art solutions and attaining the objects set out above.

In a first aspect, there is provided a graphics rendering system for rendering a 3D scene on a screen of a user device. The system includes a central processing unit (CPU) including a Scalable Vector Extension (SVE) register, a frame buffer, and a non-transitory computer-readable medium storing instructions that, when executed by the CPU, are configured to perform the following steps. Receive 3D scene data representing the 3D scene, process the 3D scene data through a graphics rendering pipeline in which graphics rendering instructions are executed in a Single Instruction, Multiple Data (SIMD) approach, wherein multiple data elements of the SIMD approach are stored in and retrieved from the SVE register, and store pixel data resulting from the graphics rendering pipeline in the frame buffer for output to the screen via a renderer.

In embodiments, the graphics rendering pipeline includes vertex generation and vertex processing.

In embodiments, the graphics rendering pipeline includes primitive generation and primitive processing.

In embodiments, the graphics rendering pipeline includes fragment generation and fragment processing.

In embodiments, the graphics rendering pipeline includes fragment processing being performed on a fragment block of M*N fragments, wherein the fragment block is loaded into and retrieved from the SVE register when executing fragment processing instructions according to the SIMD approach.

In embodiments, the fragment processing includes texture sampling for coloring the fragments based on texture data stored in a texture buffer of the system.

In embodiments, the fragment processing includes shader processing.

In embodiments, the fragment processing includes blending a pixel output of the fragment processing with pixel data included in the frame buffer.

In embodiments, the system comprises a dynamic complier configured to generate SVE code for execution by the CPU in performing the graphics rendering pipeline.

In embodiments, the dynamic compiler is configured to generate the SVE code according to a Just In Time (JIT) approach.

In embodiments, the dynamic compiler is configured to determine a number of data elements to include in the SVE register using a loop vectorization algorithm.

In embodiments, the SVE register has a total bit width of T and the data elements have a bit length of p, wherein number of data bits stored in and retrieved from the SVE register is T/p rounded to the nearest integer number of data elements that will fit in the SVE register.

In embodiments, the multiple data elements include fragments, vertices or primitives.

In embodiments, the SVE register has a bit width of between 256 and 2048 bits.

In another aspect, a user device is provided for rendering a 3D scene on a screen thereof, the user device includes a central processing unit (CPU) including a Scalable Vector Extension (SVE) register, a frame buffer, and a non-transitory computer-readable medium storing instructions that, when executed by the CPU, are configured to perform the following steps. Receive 3D scene data representing the 3D scene, process the 3D scene data through a graphics rendering pipeline in which graphics rendering instructions are executed in a Single Instruction, Multiple Data (SIMD) approach, wherein multiple data elements of the SIMD approach are stored in and retrieved from the SVE register, and store pixel data resulting from the graphics rendering pipeline in the frame buffer for output to the screen via a renderer.

In embodiments, the graphics rendering pipeline includes fragment processing being performed on a fragment block of M*N fragments, wherein the fragment block is loaded into and retrieved from the SVE register when executing fragment processing instructions according to the SIMD approach.

In embodiments, the fragment processing includes at least one of: texture sampling for coloring the fragments based on texture data stored in a texture buffer of the system, shader processing, and blending a pixel output of the fragment processing with pixel data included in the frame buffer.

In embodiments, a dynamic complier is configured to generate SVE code for execution by the CPU in performing the graphics rendering pipeline.

In embodiments, the dynamic compiler is configured to determine a number of data elements to include in the SVE register using a loop vectorization algorithm.

In another aspect, a graphics rendering computer implemented method for rendering a 3D scene on a screen of a user device is provided. The method includes: receiving, via a Central Processing Unit (CPU), 3D scene data representing the 3D scene; processing, via the CPU, the 3D scene data through a graphics rendering pipeline in which graphics rendering instructions are executed in a Single Instruction, Multiple Data (SIMD) approach, wherein multiple data elements of the SIMD approach are stored in and retrieved from an SVE register of the CPU; and storing pixel data resulting from the graphics rendering pipeline in a frame buffer for output to the screen via a renderer.

In the context of the present specification, a "server" is a computer program that is running on appropriate hardware and is capable of receiving requests (e.g., from devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "device" is any computer hardware that is capable of running software appropriate to the relevant task at hand. Thus, some (non-limiting) examples of devices include personal computers (desktops, laptops, netbooks, etc.), smartphones, and tablets, as well as network equipment such as routers, switches, and gateways. It should be noted that a device acting as a device in the present context is not precluded from acting as a server to other devices. The use of the expression "a device" does not preclude multiple devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers. It can be said that a database is a logically ordered collection of structured data kept electronically in a computer system In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
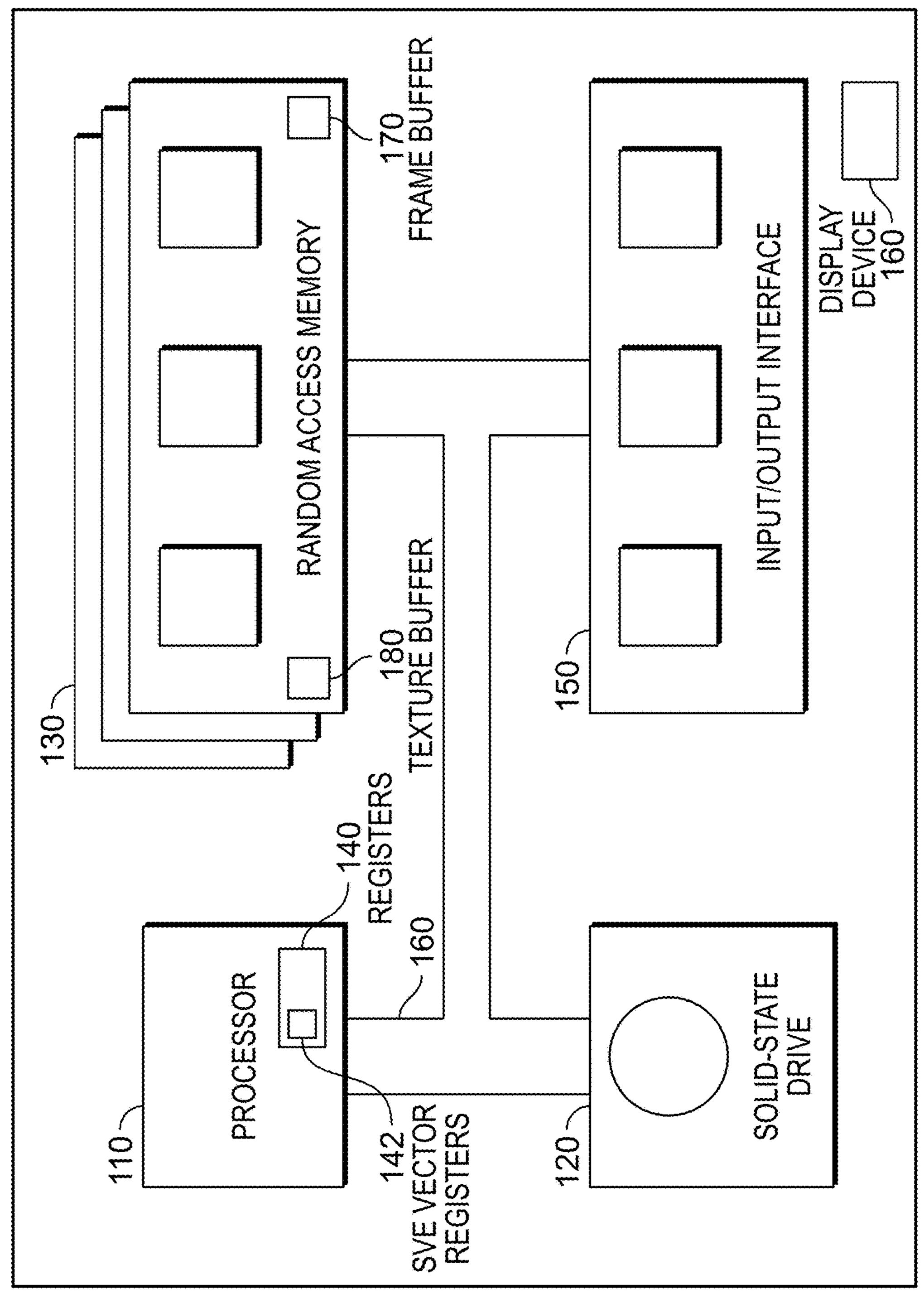
FIG. 1 illustrates an example of a computing device that may be used to implement any of the methods described herein.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general-purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

With these fundamentals in place, we will now consider some non-limiting examples to illustrate various implementations of aspects of the present technology.

FIG. 1 illustrates a diagram of a computing environment 100 in accordance with an embodiment of the present technology. In some embodiments, the computing environment 100 may be implemented by any of a conventional personal computer, a computer dedicated to operating and/or monitoring systems relating to a data center, a controller and/or an electronic device (such as, but not limited to, a mobile device, a tablet device, a server, a controller unit, a control device, a monitoring device etc.) and/or any combination thereof appropriate to the relevant task at hand. In some embodiments, the computing environment 100 comprises various hardware components including one or more single or multi-core processors collectively represented by a processor 110, a solid-state drive 120, a random-access memory 130, a display device 160 and an input/output interface 150.

In some embodiments, the computing environment 100 may also be a sub-system of one of the above-listed systems. In some other embodiments, the computing environment 100 may be an "off the shelf" generic computer system. In some embodiments, the computing environment 100 may also be distributed amongst multiple systems. The computing environment 100 may also be specifically dedicated to the implementation of the present technology. As a person in the art of the present technology may appreciate, multiple variations as to how the computing environment 100 is implemented may be envisioned without departing from the scope of the present technology.

Communication between the various components of the computing environment 100 may be enabled by one or more internal and/or external buses 160 (e.g., a PCI bus, universal serial bus, IEEE 1394 "Firewire" bus, SCSI bus, Serial-ATA bus, ARINC bus, etc.), to which the various hardware components are electronically coupled.

The input/output interface 150 may allow enabling networking capabilities such as wire or wireless access. As an example, the input/output interface 150 may comprise a networking interface such as, but not limited to, a network port, a network socket, a network interface controller and the like. Multiple examples of how the networking interface may be implemented will become apparent to the person skilled in the art of the present technology. For example, but without being limitative, the networking interface may implement specific physical layer and data link layer standard such as Ethernet, Fibre Channel, Wi-Fi or Token Ring. The specific physical layer and the data link layer may provide a base for a full network protocol stack, allowing communication among small groups of computers on the same local area network (LAN) and large-scale network communications through routable protocols, such as Internet Protocol (IP).

According to implementations of the present technology, the solid-state drive 120 stores program instructions suitable for being loaded into the random-access memory (RAM) 130 and executed by the processor 110 for executing operating data centers based on a generated machine learning pipeline. For example, the program instructions may be part of a library or an application.

The RAM may include a frame buffer 170 and a texture buffer 180. The frame buffer 170 is a section of memory that holds the final image that is displayed on a screen of the display device 160. It stores the color values for each pixel, along with additional information such as depth, alpha, and stencil values. The frame buffer 170 represents what the user sees on their screen of the display device 160. It is continuously updated as the graphics pipeline processes and renders the scene, as will be described below. The texture buffer 180 is a memory area used to store textures, which are 2D images that are applied to surfaces in the scene to add detail, color variation, and realism. The texture buffer 180 holds the image data for these textures and allows the graphics pipeline to sample the textures during shading and rendering.

In some embodiments of the present technology, the computing environment 100 may be implemented as part of a cloud computing environment. Broadly, a cloud computing environment is a type of computing that relies on a network of remote servers hosted on the internet, for example, to store, manage, and process data, rather than a local server or personal computer. This type of computing allows users to access data and applications from remote locations, and provides a scalable, flexible, and cost-effective solution for data storage and computing. Cloud computing environments can be divided into three main categories: Infrastructure as a Service (IaaS), Platform as a Service (PaaS), and Software as a Service (SaaS). In an IaaS environment, users can rent virtual servers, storage, and other computing resources from a third-party provider, for example. In a PaaS environment, users have access to a platform for developing, running, and managing applications without having to manage the underlying infrastructure. In a SaaS environment, users can access pre-built software applications that are hosted by a third-party provider, for example. In summary, cloud computing environments offer a range of benefits, including cost savings, scalability, increased agility, and the ability to quickly deploy and manage applications.

The computing environment 100 includes a display device 160, which may be included on a user device, such as a tablet, laptop, smart phone, or similar electronic device. The processor 110 is configured to render graphics on the display device 160 by converting digital data into visually perceptible content on a screen of the display device. This procedure encompasses the transformation of raw data, such as images, videos, and interactive elements, into visuals that users can observe and interact with.

As will be described further below, the processor 110 is configured to execute software instructions to execute graphics rendering. At a high level, the processor performs graphics processing by adopting dynamic M×N pixels (where M×N is greater than 4) as a primitive basic unit (instead of 2×2 pixels) so that software graphics rendering feeds a larger chunk of data to a hardware SVE component, thereby improving efficiency of the graphics processing pipeline. The processor 110, which is a CPU in embodiments of the present disclosure, includes registers 140 that store temporary data and enable simultaneous execution of operations on multiple data elements. The registers 140 optimize the rendering pipeline through specialized storage for attributes, textures, shaders, and control information. The registers 140 utilized by the graphics rendering processes of the present disclosure include SVE vector registers 142 enabling use of Scalable Vector Extension (SVE) architecture (the Z-registers) to enhance performance of CPU graphics rendering.

Scalable Vector Extension (SVE) is a vector processing architecture enabling vector computations across a wide range of vector lengths. Unlike traditional vector architectures with fixed vector sizes, SVE allows processors to dynamically adjust the vector length based on the specific workload and data characteristics. SVE offers a scalable vector length, which means that processors utilizing SVE can seamlessly adapt to the varying requirements of different tasks. This adaptability is achieved through the utilization of different vector register sizes, referred to as "Z-registers". SVE has been designed to enable processors to efficiently handle diverse workloads such as High Performance Computing (HPC), scientific simulations and machine learning applications, which require large quantities of data processing. Despite not being designed for graphics rendering, embodiments of the present disclosure provide a surprising use of SVE to adopt dynamic M×N pixels as a primitive basic unit (instead of 2×2 pixels) so as to more efficiently render graphics.

Continuing to refer to FIG. 1, the processor 110 executes the graphics rendering functions and methods described hereinbelow. The processor 110 may be included in a user device (not shown) or a server (not shown) communicatively coupled to a client device over a network. The client device or user device may comprise one or more components of the computing environment 100 described above. Similarly, the server may comprise one or more components of the computing environment 100 described above. In some embodiments, a client device may be a "thin client", which is a computer system that relies on the server for considerably increased processing power, storage, and other resources. In contrast, the server may be a "cloud server", which is a remote computer system that provides a range of services and resources over the communication network, such as the internet for example. Whether the processor 110 is included in the client device, the server or a combination of both, graphics rendering steps are performed according to the general graphics processing pipeline shown in FIG. 3 and described further below but adapted so as to exploit SVE hardware capabilities for enhanced graphics rendering performance.

Figure 2:
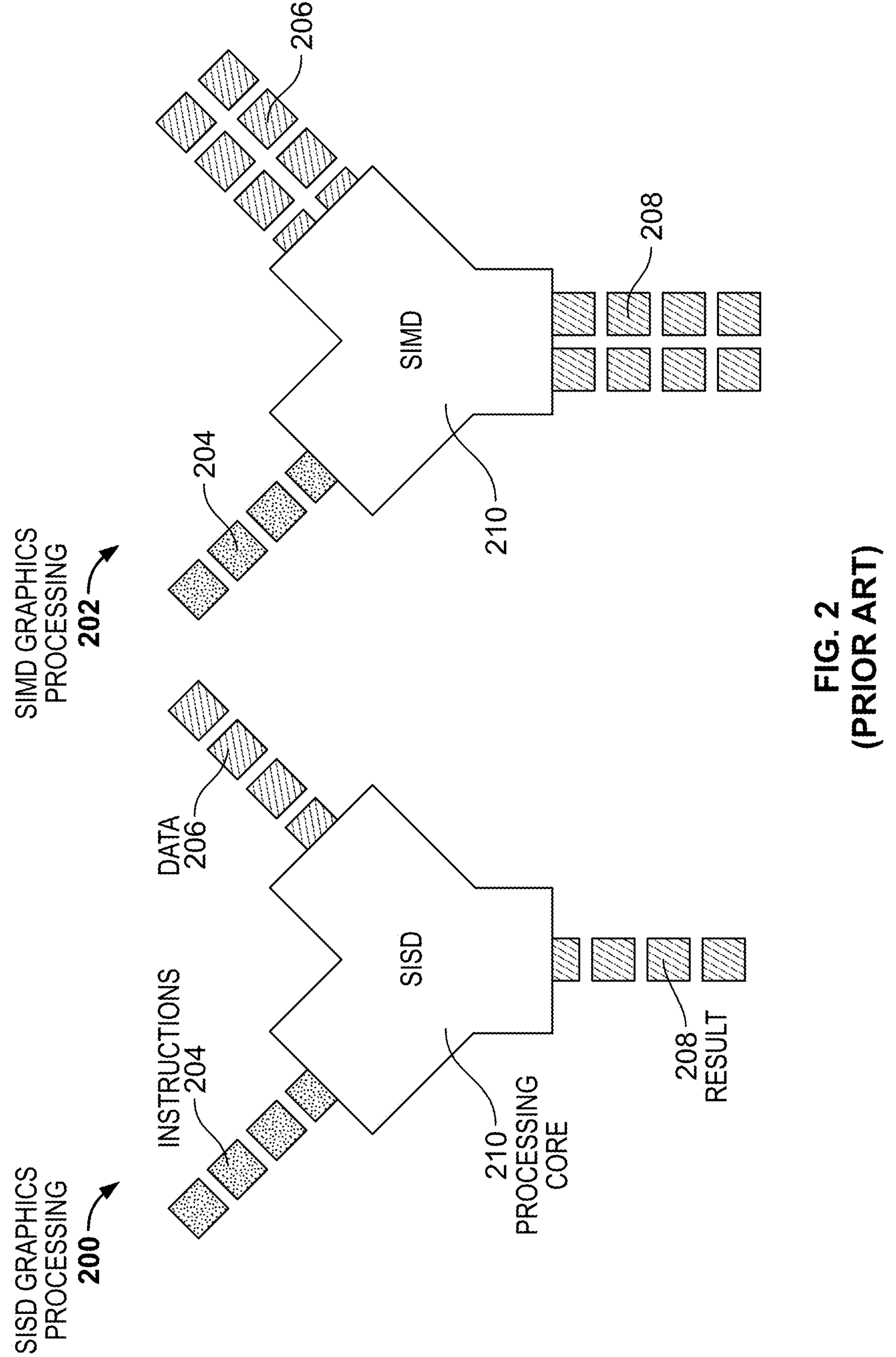
FIG. 2 shows a schematic diagram of a prior art approach to processing data and instructions in graphics rendering.

Referring to FIG. 2, a schematic diagram of graphics processing according to a prior art approach is illustrated. Single Instruction, Single Data (SISD) graphics processing 200 is a form of processing in which a single instruction 204 operates on a single piece of data 206 by a processing core 210 at a time. The processing core 210 is an example of the processor 110 of FIG. 1 and includes registers as described with reference to FIG. 1. The SISD graphics processing 200 refers to an execution model where a graphics operation is performed on one element of data 206 using a single instruction 204, resulting in a single output result 208. In SISD graphics processing 200, each instruction 204 corresponds to a specific operation that needs to be performed on the data 206. For example, an instruction might involve calculating the color of a single pixel based on lighting, shading, and texture information. Each instruction 204 acts on a single element of data 206, and these instructions are executed sequentially. In SISD graphics processing 200, the data may refer to individual elements within a graphical scene. This may include attributes of vertices, pixel colors, texture coordinates, and other information that defines the visual content. Each instruction 204 operates on one data element at a time. A result 208 of an SISD graphics processing instruction 200 is a single output corresponding to the operation performed on the individual element of data 206. For instance, if the instruction 204 involves applying a lighting model to a pixel's color, the result would be the final color value of that pixel after the lighting computation.

FIG. 2 also schematically illustrates Single Instruction, Multiple Data (SIMD) graphics processing 202, which is a parallel processing model where a single instruction 204 is applied simultaneously to multiple elements of data 206 by the processing core 210. SIMD graphics processing 202 may refer to performing the same operation on multiple pixels, vertices, or other elements of data 206 in parallel. In SIMD graphics processing 202, a single instruction 204 is applied to a group of elements data 206, all performing the same operation at the same time. For example, a SIMD instruction 204 might involve calculating the lighting for a batch of pixels in parallel. In SIMD graphics processing 202 multiple elements of data 206 are processed together and this the data 206 is organized into vectors, where each data element corresponds to a specific attribute, color component, or other relevant data. The result 208 of a SIMD graphics processing instruction 204 is a set of outputs, one for each data element in the SIMD data vector. For instance, if a SIMD instruction computes the color of a batch of pixels based on a lighting model, the result would be the final color values for all the pixels processed in that batch. SIMD graphics processing 202 may be more efficient for graphics processing tasks that involve applying the same operation to a large number of data elements, such as shader calculations, texture sampling, and color blending.

In SIMD graphics processing 202 (and with reference to the computing environment 100 of FIG. 1), the registers 140 provide memory locations within the processing core 210. The registers 140 may include vector registers designed to hold multiple data elements, forming a vector. For example, in graphics rendering, a vector register might store color components (RGB) for a group of pixels. To execute instructions by the processing core 210, a single SIMD instruction 204 is applied to an entire vector register simultaneously. This instruction 204 dictates the operation to be performed on each element of data 206 within the vector. The processing core 210 (included in the processor 110 of FIG. 1) retrieves a SIMD instruction 204 from memory or cache, interprets the SIMD instruction and prepares it for execution, and executes the SIMD instruction 204 across the vector registers. The same operation is applied to each data element within the vector register. Elements of data 206 flow through the SIMD pipeline, where the SIMD instruction 204 is carried out on each element simultaneously. After the operation is completed, the processed data elements form an output vector as the result 208, which can then be used for subsequent stages of rendering.

Figure 3:
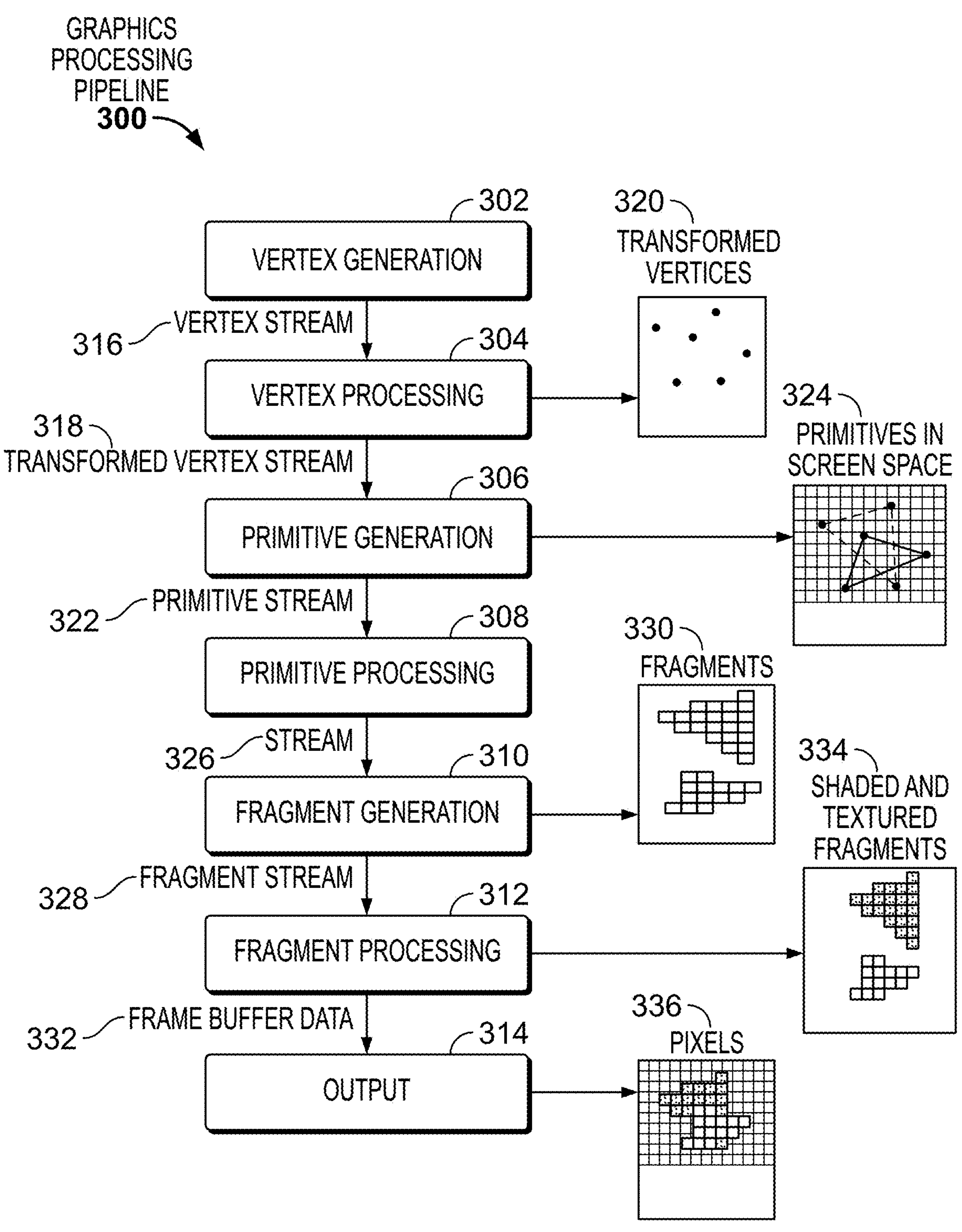
FIG. 3 shows a schematic diagram of a prior art graphics rendering pipeline.

FIG. 3 shows a graphics processing pipeline 300 according to a prior art arrangement. Although the graphics processing pipeline 300 of FIG. 3 is prior art, the processes are relevant to the following description of the technology of the present disclosure and may be performed by the processor 110 (CPU) of FIG. 1. It should be appreciated that the graphics processing pipeline 300 described below is provided for exemplary purposes only and further operations or less operations may be included. The graphic processing pipeline 300 illustrates exemplary steps for converting 3D images/scenes of a digital 3D model into 2D images on a screen of the display device 160. In the example of FIG. 3, the graphics processing pipeline 300 includes the steps of vertex generation 302, vertex processing 304, primitive generation 306, primitive processing 308, fragment generation 310 and rasterization, fragment processing 312, and output 314.

Vertex generation 312 includes creation of basic geometric data to represent 3D objects or scenes in a computer graphics environment. The step of vertex generation 312 receives, as input data, digital information that defines the basic structure of 3D objects and scenes to be rendered. This data provides the foundational geometry for creating vertices, which are the corner points of geometric shapes. Vertex generation 312 includes generating the corner points, or vertices, of geometric shapes, which are then processed and transformed to create 3D models that form the basis of a visual scene. Vertex generation 312 outputs a vertex stream 316 including points in 3D space that define corners and endpoints of polygons or other geometric primitives. The vertex stream 316 may be associated with various attributes such as spatial coordinates (X, Y, Z), color, texture coordinates, normals (surface orientation), and other relevant information.

Vertex processing 304 occurs after vertex generation 302 and involves transforming and preparing the vertices in the vertex stream 316 for further stages of the graphics processing pipeline 300. Vertex processing 304 may include various operations to position, orient, and prepare the vertices for projection onto a 2D screen space. Vertex processing 304 may include transformations such as scaling, rotation, and translation to position and orient objects in the 3D scene. Vertex processing 304 may include clipping vertices outside a camera's view frustum (visible area) to ensure only relevant geometry is processed in subsequent stages. The camera in vertex generation 302 and vertex processing 304 defines a perspective from which the 3D scene is viewed and influences the transformation of vertices to create a coherent 3D-to-2D projection for rendering. Vertex processing 304 may include back-face culling by removing vertices representing the backside of objects not visible to the camera. Vertex processing 304 may include projection of vertices from 3D space onto a 2D plane, representing what the camera sees. This stage includes converting 3D coordinates to 2D screen coordinates. Vertex processing 304 may include a process of mapping the projected vertices to pixel coordinates on the screen based on the resolution and aspect ratio of the display device 160. The transformed vertices 320 according to the various steps of vertex processing 304 along with their associated attributes are output as a transformed vertex stream 318 to the step of primitive generation 306.

The steps of primitive generation 306 and primitive processing 308 receive the transformed vertex stream 318 and assemble the transformed vertices 320 into more complex geometric shapes, known as primitives. Primitives are basic geometric shapes formed by connecting the transformed vertices 320. Common primitives include points, lines, and polygons (such as triangles, quads, or more complex polygons). Primitive generation 306 may include primitive assembly, which is a process of connecting the transformed vertices 320 in a specific order according to their connectivity information. For example, a triangle primitive is formed by connecting three vertices. Primitive generation 306 includes geometry creation by determining the type of primitives to create (e.g., triangles) and their connectivity, which defines how vertices are grouped to form each primitive. The step of primitive generation 306 outputs a primitive stream 322 to primitive processing 308.

The step of primitive processing 308 may include various processes. Primitive processing 308 may include back-face culling for primitives whose faces are not visible to the camera, and clipping for primitives that fall outside the camera's view frustum. Primitive processing 308 may include tessellation (optional) to increase the level of detail in the scene. By subdividing primitives into smaller parts for smoother surfaces. Primitive processing 308 may include a second step of vertex transformation whereby some further transformations are applied to primitives as a whole at this stage. Primitive processing 308 may include computing primitive attributes for each primitive, such as the normal vector, which is useful for accurate shading and lighting calculations. In cases where a primitive carries parameters like color or texture coordinates, these values may be interpolated across the primitive's surface in a parameter interpolation step. After parameter interpolation, primitive processing 308 may include another round of clipping to ensure that the primitives fit within the screen boundaries. Primitive processing 308 outputs a stream 326 of primitives in screen space 324.

In fragment generation 310, the stream 326 of primitives in screen space 324 output from primitive processing 308 is transformed into fragments 330. Fragments are essentially potential pixels that could contribute to the final image on the screen of the display device 160. Fragment generation 310 includes rasterization, which generates a fragment stream by determining which parts of an area of a primitive cover specific pixels on the screen. Each generated fragment inherits attributes from the corresponding primitive, such as color, texture coordinates, depth value, and interpolated parameters.

Fragment processing 328 occurs after fragment generation 310 and involves performing operations on each fragment to determine their final appearance. This stage includes pixel-level operations such as shading, texture sampling, depth testing, and blending. The results of fragment processing 328 contribute to the final pixel colors that make up the rendered image.

Various operations may be performed in fragment processing 312 including shading, which involves applying lighting calculations to determine the color of each fragment 330 based on factors like light sources, normals, and material properties. Fragment processing 312 may include texture sampling to associate fragments with textures that are sampled to determine the fragment's color, allowing for detailed and realistic surface appearances and may use texture information stored in the texture buffer 180. Various tests may be applied to each fragment in fragment processing 312 including depth testing, stencil testing and alpha blending. Shaded and textured fragments 334 that pass all the tests are included in frame buffer data 332 that are written to the frame buffer 170, which corresponds to the final output image seen on the screen of the display device 160.

Fragment generation 310 and fragment processing 312 collectively refine the geometric output from the stage of primitive processing 308 to provide pixel-level information (pixels 336) that contributes to the final rendered image. These stages involve calculations and operations that bring textures, lighting, shading, and other details to the visual scene. After fragment processing, the data in the frame buffer 170 is output to the display device 160, where it is rendered as the visual output on the screen.

Figure 4:
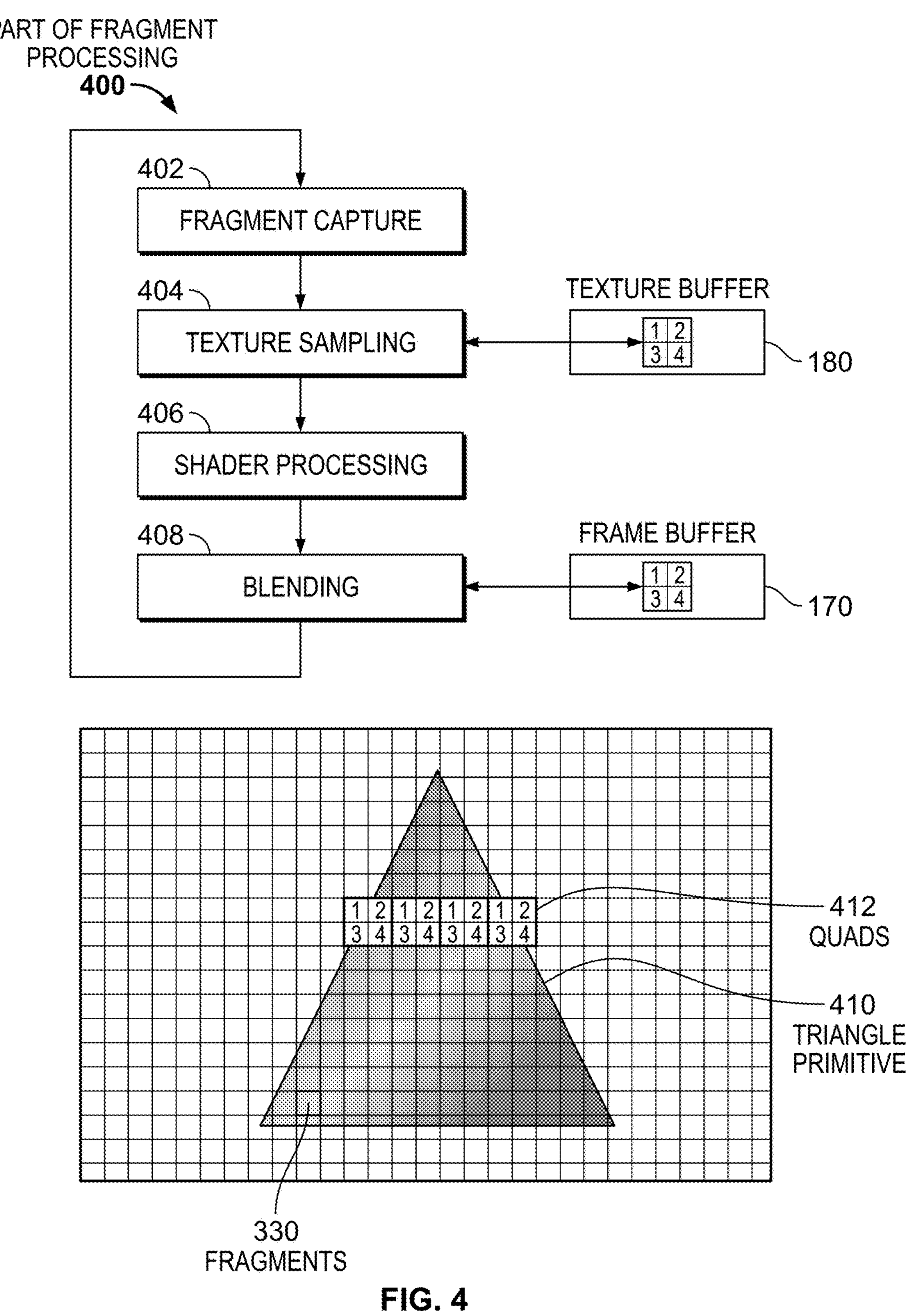
FIG. 4 shows a schematic diagram of a prior art approach to part of the graphics rendering pipeline of FIG. 3.

Referring to FIG. 4, a part of the graphics processing pipeline 300 of FIG. 3, specifically steps included in a part 400 of fragment processing 312, is described in further detail according to a prior art approach. In the exemplary prior art approach, an SIMD parallel processing technique is assumed in which quads 412 (2 fragments by 2 fragments) of fragments 330 (also referred to as pixels herein) are processed together in a SIMD fashion. In the specific example provided, the primitive provided by primitive processing 308 is in the form of a primitive triangle 410, which is one of the most common rendering shapes. The part of fragment processing 400 includes the stages of fragment capture 402, texture sampling 404, shader processing 406 and blending 408. Fragment capture 402 may embody the foregoing processes described with respect to FIG. 3, namely those of vertex generation 302, vertex processing 304, primitive generation 306, primitive processing 308 and fragment generation 310 leading to the fragment stream 328 from which fragments 330 are captured. In the SIMD processing of FIG. 4, a processing core 210 having 128 bit (vector) registers 140 is assumed. In graphics rendering coordinates, each pixel has position (x, y, z, w) and color (r, g, b, a), which results in 4D matrix calculations. To be accelerated by SIMD, 2×2 pixels is chosen as primitive processing units and each value is a 32-bit float, which fills the 128 bit vector register (32*4). As such, in the step of fragment capture 402 in this specific prior art example, quads of 2*2 fragments 330 (or pixels) are loaded to the vector register of the processing core to be operated on simultaneously in each of the subsequent operations of texture sampling 404, shader processing 406 and blending 408. It should be appreciated that each of these operations may include plural instructions that are performed simultaneously on the 4 fragments in the vector register.

The step of texture sampling 404 fetches color data from a texture map using attributes of the quad of fragments 330 being processed, such as texture coordinates. These coordinates define where in a texture map the color data should be sampled. The texture map is stored in the texture buffer 180 and includes the color information. The texture map may represent a 2D image used to apply surface details, patterns, or materials to objects during rendering including the color information. The sampled color contributes to the final appearance of each fragment 330. Exemplary instructions performed simultaneously on the four fragments 330 in texture sampling 404 include loading texture coordinates into the registers 140 for each of the quad of fragments 330 as a single instruction performed on each fragment 330 simultaneously. In this example, where the SIMD width is 4 fragments 330, each register holds the texture coordinates of four fragments. Further, a single texture sampling instruction is executed using the loaded texture coordinates. This instruction may fetch color data from the texture map in the texture buffer 180 using the coordinates and place the sampled colors into the register 140.

After texture sampling 404, shader processing 406 refines the appearance of the fragments 330 by considering various attributes. These attributes include texture coordinates, normals, and material properties. The camera's location influences how fragments are viewed, and lighting calculations simulate how light interacts with the surface. By combining texture colors with these attributes and calculations, shader processing 406 produces the ultimate color, shading, and other visual aspects of each fragment 330, resulting in a realistic and visually compelling rendered scene. In the exemplary SIMD approach to shader processing 406, the same shader instructions are applied to the quad of fragments 330 simultaneously. Exemplary such instructions include loading the vector register (included in register 140) with the quads 412 output from the texture sampling 404 and applying lighting calculations, shading effects and camera location. A lighting effect instruction calculates how light interacts with a fragment's surface, influencing its color and brightness. This instruction considers fragment attributes like normals, material properties, light sources, and their characteristics. A camera location instruction determines how the fragments appear from the viewpoint of the camera. It takes into account attributes like fragment position, normals, and the camera's position and orientation. These instructions are applied to each fragment 330 of the quads 412 stored in the registers 140. The data output from shader processing 406 representing shaded and colored pixels corresponding to each fragment may be written to the frame buffer 170.

In the step of blending 408, color values produced by shaders are combined with the existing color values already present in the frame buffer 170. This operation enables the integration of newly calculated fragment colors into the overall image. Color blending takes into account factors like fragment transparency (alpha), blending modes, and the existing color at the pixel location. This step ensures that the final pixel colors represent the layered contributions of multiple fragments, creating smooth transitions, transparency effects, and accurate color interactions in the rendered image. In the exemplary SIMD approach, specific color blending instructions operate on quads 412 data simultaneously using the registers 140. These instructions determine how the calculated fragment colors will be combined with the existing frame buffer colors. The instructions may include loading the calculated color values for the quads 412 (or these may be already loaded from previous steps), reading current color values from the frame buffer 170 at the corresponding pixel locations into additional registers 140 and performing a single blending instruction on all the fragments' color values and the frame buffer colors. The blending instruction combines the fragment colors and frame buffer colors according to specified blending modes, factors, and transparency values (alpha). This produces the final color values that will be written back to the frame buffer 170. A further SIMD instruction may be frame buffer write which writes the blended color values back to the appropriate memory locations in the frame buffer 170.

The present technology allows graphics processing pipelines including fragment processing to be made significantly more efficient than the described 2*2 SIMD approach. In particular, the present disclosure proposes to adopt dynamic M×N pixels (where M×N is greater than 4) as a primitive basic unit (instead of 2×2 pixels) to be fed through the graphic processing pipeline. That is, a larger chunk of data is captured for parallel processing during fragment processing (and other parts of the graphics processing pipeline) by the realization that SVE registers can be utilized even though SVE is not designed for graphics rendering.

Figure 5:
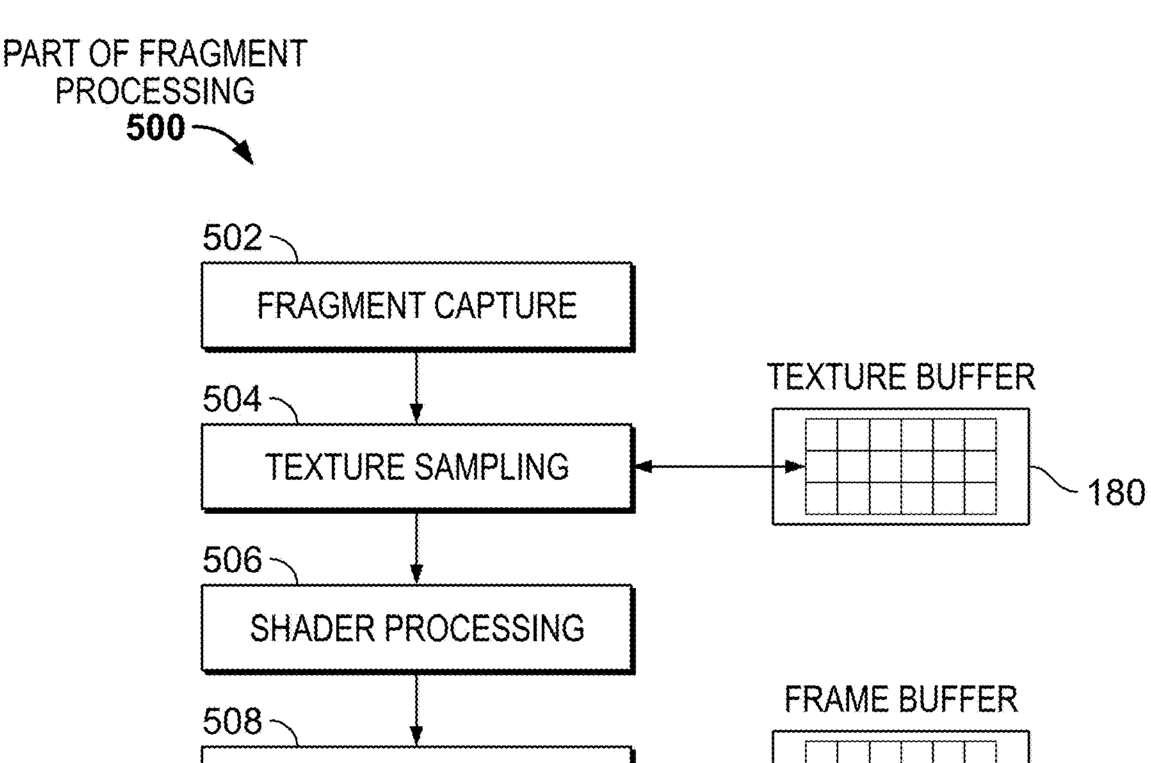
FIG. 5 shows a schematic diagram of graphics rendering processes, in accordance with certain non-limiting embodiments of the present technology.
Figure 5:
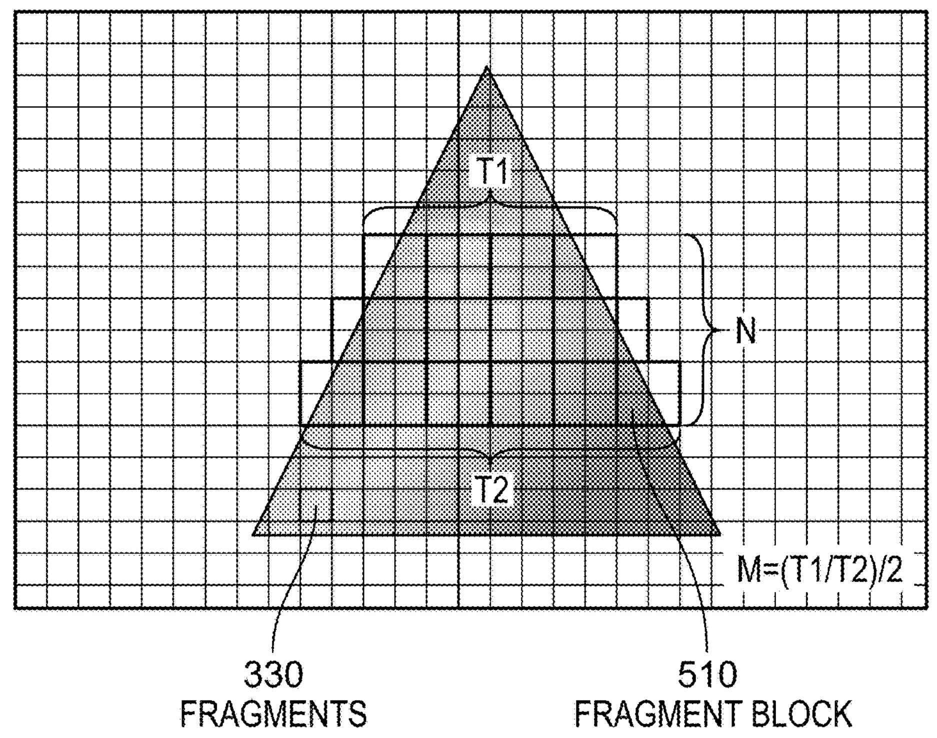

Referring to FIG. 5, part of the fragment processing 500 is illustrated according to the present disclosure. The steps of fragment capture 502, texture sampling 504, shader processing 506 and blending 508 will not be additionally described in terms of the instructions and functions being performed and reference is made to the description above with reference to FIGS. 3 and 4. In the step of fragment capture 502, a fragment block 510 is sampled from the fragment stream 328 (which may be located in RAM 130). The fragment block 510 is sized based on a bit width of the SVE vector registers 142. The SVE vector registers 142 provide a flexible vector length that can vary at runtime, and these vector registers are designed to hold vector elements of various data types. The present technology proposes to pick-up M×N fragments 330, which may include multiples of the 2×2 quad capabilities of the prior art arrangement of FIG. 4 depending on a bit width of the SVE vector registers 142. Assuming a bit width of the SVE vector registers 142 of T and a pixel bit length of p, a number of pixels (fragments) x that may be captured and processed in parallel is x=T/t. For example, assuming a SVE vector register 142 having a bit width of 2048 bits (T=2048) and a pixel bit length of 32 (t=32), the number of fragments processed in parallel is 64 (x=64). This could be arranged as a fragment block 510 of M×N where M and N are both 8. Such a fragment block 510 includes 16× the number of fragments 330 than a 2×2 quad as in the prior art example of FIG. 4, leading to a 16× performance improvement. The SVE vector register 142 may have a bit width of 256 to 2048 bits. If an assumption is made of a primitive to be rendered having M×N fragments where M×N=T (bit width of the SVE vector register), then the technology of the present disclosure is able to parallel process (in an SIMD way) through the graphics processing pipeline 300 (or at least the part of fragment processing 500) the entire primitive in a single processing loop whereas 2×2 SIMD processing per the prior art approach of FIG. 4 would require a loop count of M×N/4. As such, the present technology offers significant benefits by the surprising alternative application of SVE hardware components in place of conventional graphics processing registers.

Figure 6:
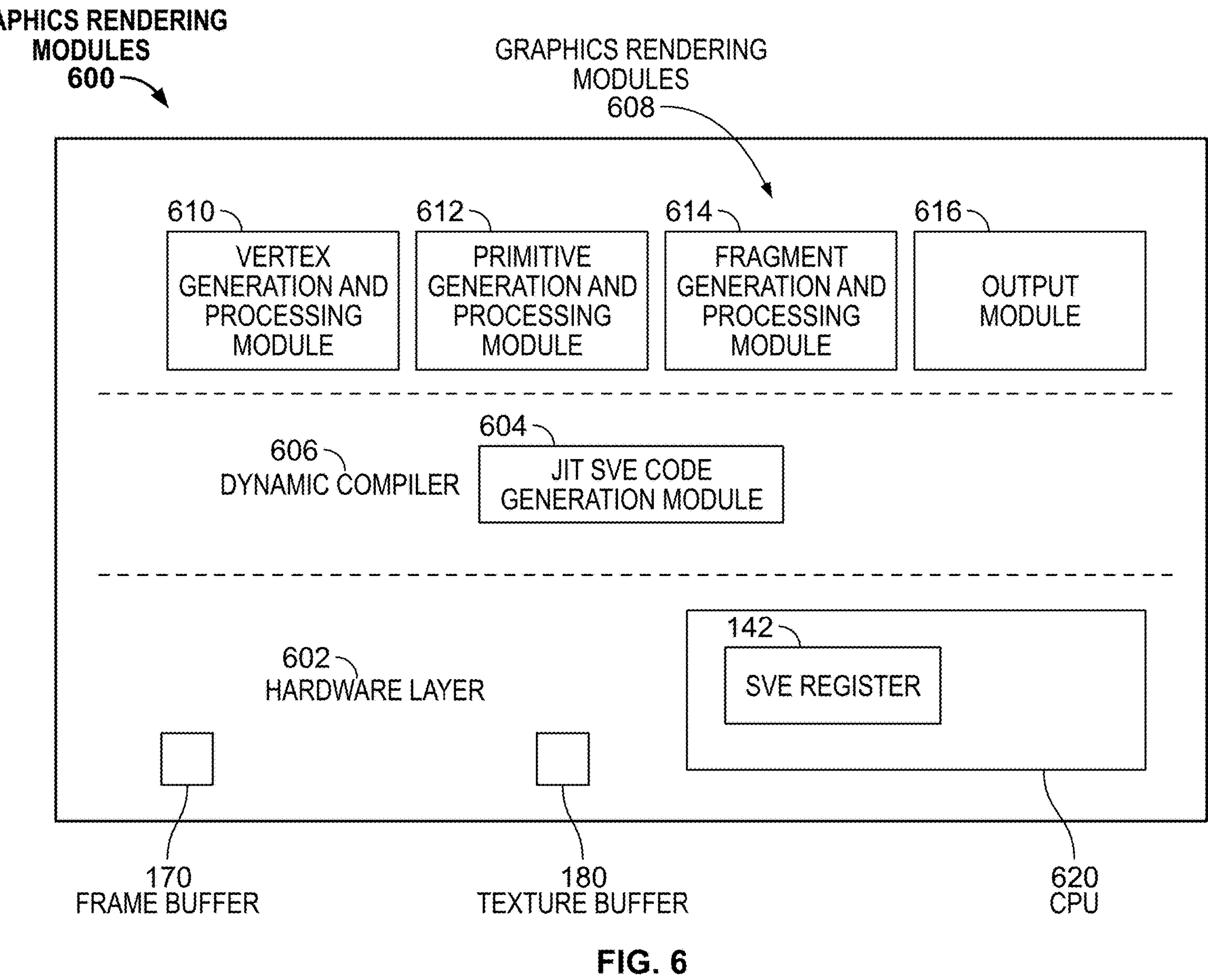
FIG. 6 shows a schematic diagram of a system structure for performing graphics rendering, in accordance with certain non-limiting embodiments of the present technology.

FIG. 6 provides a schematic diagram of a graphics rendering system 600 in accordance with embodiments of the present disclosure. The graphics rendering system 600 includes a hardware layer 602, a dynamic compiler 606 and graphics rendering modules 608. The hardware layer includes a CPU 620 as an example of the processor 110 of FIG. 1 including a processing core (not shown) and a SVE register 142. The hardware layer 602 further includes the frame buffer 170 and the texture buffer 180. The graphics rendering system 600 includes graphics rendering modules 608 including a vertex generation and processing module 610, a primitive generation and processing module 612, a fragment generation and processing module 614 and an output module 616. The vertex generation and processing module 610 is configured to perform the vertex generation and processing steps 302, 304 described with reference to FIG. 3. The primitive generation and processing module 612 is configured to perform the primitive generation and processing steps 306, 308 described with reference to FIG. 3. The fragment generation and processing module 614 is configured to perform the fragment generation and fragment processing steps 310, 312 described with reference to FIG. 3 and further detailed with reference to FIGS. 4 and 5. However, instructions of the fragment generation and processing module 612 are performed in an SIMD way using M×N fragments 330 by loading the SVE register 142 with the M×N fragments and performing each of the previously described fragment processing instructions in parallel on the fragment data in the SVE register 142. The output module 616 performs the output step 314 described with reference to FIG. 3 to write the processed fragments into the frame buffer as the final pixels for displaying on a screen of the display device 160. The graphics rendering system 600 further includes a dynamic compiler 606 for generating Just In Time (JIT) SVE compliant code for primitive, vertex and fragment processing by the respective modules 610, 612, 614. Although the present description focuses largely on use of the SVE register 142 in the fragment processing step 312, the SVE register 142 can similarly bring about performance benefits by taking on more data than otherwise would be possible throughout the graphics processing pipeline 300. The dynamic compiler 606 is configured to generate SVE code by adding a loop vectorization pass whereby fragments are loaded into the SVE register 142 up to a bit width limit of the SVE register 142.

Continuing to refer to FIG. 6 and FIG. 3 in combination, the vertex generation and processing module 610 is configured to direct the CPU 620 to transform vertex data in the vertex stream 316 into transformed vertices 320 (in screen space) through scaling, rotation, and projection instructions. These instructions/computations may be optimized using SVE's SIMD capabilities since the SVE register 142 can be fully loaded with the vertex data and the scaling, rotation and projections instructions applied to each vertex defined by the vertex data can be performed in parallel. The primitive generation and processing module 612 may also utilize the SVE register 142 to assemble primitives in screen space 324 from the transformed vertices 320 using assembly and culling instructions supported by SIMD parallelism. The fragment generation and processing module 614 generates fragments 330 based on the primitives in screen space 324 and performs texture sampling (taking texture data from the texture buffer 180) and shader instructions on the fragments 330 loaded in the SVE register 142. As part of fragment processing 312, the fragment generation and processing module 616 blends colors of generated shaded and texture fragments 334 with existing contents of the frame buffer 170 by performing a color merging instruction on data within the SVE register 142. The output module 616 is configured to write the final colors of the pixels 336 into the memory of the frame buffer 170 ready for display. The JIT dynamic compiler 606 generates SVE code tailored for the architecture of the CPU 620 taking into account the capabilities (e.g. bit width) of the SVE register 142 to allow execution of parallel computations at each stage of the graphics processing pipeline 300.

Figure 7:
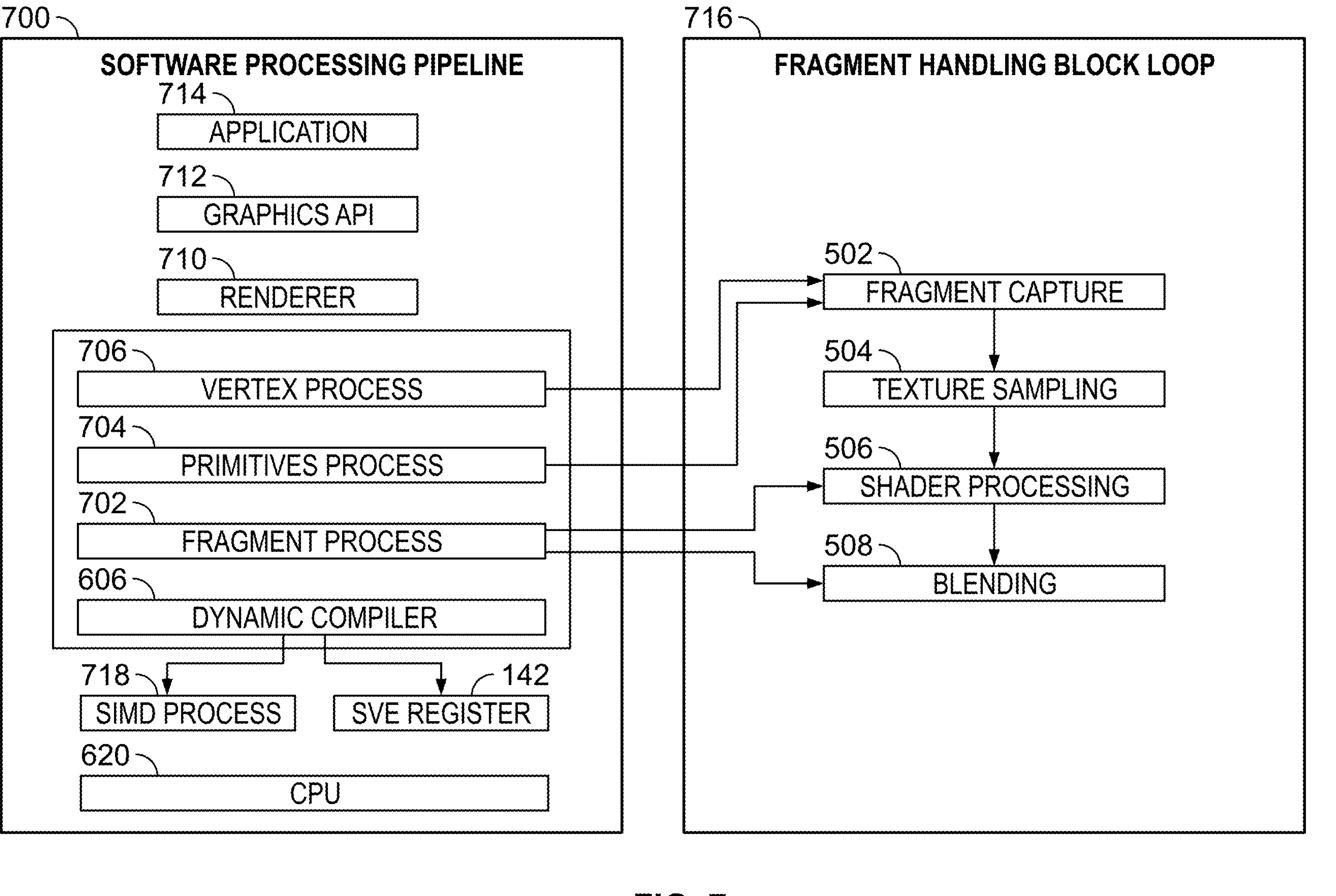
FIG. 7 shows a schematic diagram of a software processing pipeline for graphics rendering, in accordance with certain non-limiting embodiments of the present technology.

With reference to FIG. 7, there is depicted a schematic representation of a software processing pipeline 700 constituting a method according to various embodiments of the present disclosure. The software processing pipeline can be executed by a user device including the display device 160 and the CPU 620 or by a server including the CPU 620 and sent to the user (client) device over a network (e.g. the internet) for display on the display device 160 of the user device.

The software processing pipeline 700 includes steps similar to the graphics processing pipeline 300 of FIG. 3. As such, the features described in detail with respect to FIG. 3 will not be repeated with respect to the software processing pipeline 300 for conciseness reasons. The software processing pipeline 700 includes a vertex process 706, a primitive process 704, a texture sampling process 708 and a fragment process 702. The vertex process 706 receives digital data describing a scene to be rendered and includes features of vertex generation 302 and vertex processing 304 as described with reference to FIG. 3. The digital data describing the scene is generated by an application 714 using tools, libraries, and specifications of the graphics Application Programming Interface API 712 that developers may use to interact with graphics hardware and create visual content in applications, games, simulations, and other graphics-related software. Exemplary graphics APIs 712 include Vulkan, DirectX, OpenGL, and Metal. The digital data describing the scene to be displayed is passed to the further parts of the software processing pipeline 700.

According to the vertex process 706 (which has been described further above with respect to vertex generation 302 and vertex processing 304 in FIG. 3), the scene digital data is processed to generate vertices comprising points that define the shape, position, and attributes of objects within the scene (which may be a 3D environment). The vertex process 706 additionally includes adjusting the vertices according to transformations such as scaling, rotation, translation, and projection, ensuring their accurate placement within the 3D scene with respect to a camera viewpoint. The dynamic compiler 606 may determine SVE code for the vertex process in a JIT way and further determine how many vertices can be parallel processed through instructions of the vertex process 706 based on the data size per vertex and a bit width of the SVE register 142.

According to the primitives process 704, the transformed vertices 320 are assembled into geometric shapes like triangles, lines, or points, forming the basic building blocks (primitives) for further processing in the software processing pipeline 700. After the assembly of vertices into primitives, the primitives process 704 may include tasks such as back-face culling, which determines whether a primitive is facing away from the camera and can be discarded, and clipping, which ensures that only the visible parts (within a view frustum of the camera) of primitives are processed, thereby providing primitives in screen space 324. The dynamic compiler 606 may determine SVE code for the vertex process in a JIT way and further determine how many primitives can be parallel processed through instructions of the primitives process 704 based on the data size per primitive and a bit width of the SVE register 142.

According to the fragment process 702, fragments 330 are generated from the geometric primitives (triangles, lines, or points) in screen space 324 assembled in the primitives process 704. The fragment process 702 encompasses tasks like applying shaders for lighting and shading effects, texture sampling for realistic surfaces and coloring, and depth testing to ensure correct visibility order, ultimately producing the final pixel colors that will be blended and displayed on the screen of the display device 160. As with each of the various processes (vertex process 706 and primitives process 704), an SIMD process 718 is implemented using the SVE register 142 so that multiple fragments (M×N) can be processed simultaneously using a single instruction per operation, leveraging parallelism to efficiently compute lighting, texture sampling, and other fragment-level operations. The dynamic compiler 702 is used to generate machine code at runtime, tailoring it to the specific hardware and software environment, in particular the SVE register 142. The dynamic compiler 702 executes a loop vectorization by analyzing loops in the code and transforming them to operate on multiple fragments simultaneously in a way that fully utilizes a bit width of the SVE register 142.

Continuing to refer to FIG. 7, the fragment process 702 includes a fragment block handling loop 716, which includes steps of fragment capture 502, texture sampling 504, shader processing 506 and blending 508, which are according to the corresponding description in FIG. 5. Fragment capture 502 embodies the vertex process 706 and the primitive process 704 as well as fragment generation from the resulting primitives according to part of the fragment process. In essence, the fragment capture 502 includes receiving the fragment stream 328 (see FIG. 3). Texture sampling 504 is performed by which color information is retrieved from a texture map in the texture buffer 180 based on texture coordinates associated with each fragment 330. These fetched color values are used to enhance the appearance of the rendered object by applying realistic textures to its surfaces. This results in colored fragments that are operated upon by shader processing 506 including camera location and lighting effect operations to control pixel colors, lighting effects, and other visual properties. In blending 508, the color of the shaded and textured fragments 334 (see FIG. 3) are combined with the existing colors in the frame buffer 170 using blending equations, considering factors like transparency and opacity. The blending 508 may include a depth test operation by comparing the depth (distance from the camera) of the fragments with the depth value already stored in the frame buffer 170 for the same pixel position. If the newly processed fragment is closer to the camera (has a smaller depth value), it passes the depth test and replaces the existing pixel color in the frame buffer 170; otherwise, it is discarded as it is obscured by a previously rendered object.

The fragment block handling loop 716 applies the various instructions of texture sampling 504, shader processing 506 and blending according to the SIMD process 718 by filling the SVE register 142 with a fragment block 510 and repeating the steps of the fragment block handling loop 716 until all fragments of the primitive (e.g. the triangle primitive 410 shown in FIG. 5) have been processed. The fragments after blending are written to the frame buffer 170 for output to the display device 160 via the renderer 710.

The technology of the present disclosure whereby SVE capabilities are leveraged to improve efficiency could be incorporated into any graphics rendering applications that could be running in cloud, personal computer, table and/or smart phone provided that the device is SVE enabled. Applications include, but are not limited to, games, Computer Aided Design, animation, web browser, etc.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A graphics rendering system for rendering a 3D scene on a screen of a user device, the system comprising:

a central processing unit (CPU) including at least one hardware-implemented Scalable Vector Extension (SVE) register;

a frame buffer; and a non-transitory computer-readable medium storing instructions that, when executed by the CPU, are configured to:

receive 3D scene data representing the 3D scene;

process the 3D scene data through a graphics rendering pipeline in which graphics rendering instructions are executed in a Single Instruction, Multiple Data (SIMD) approach, wherein multiple data elements of the SIMD approach are stored in and retrieved from the SVE register; and store pixel data resulting from the graphics rendering pipeline in the frame buffer for output to the screen via a renderer;

wherein the graphics rendering pipeline includes fragment processing being performed on a fragment block of M*N fragments, wherein M and N are determined based on at least one of a bit width of the SVE register and a vector length of the SVE register, the vector length varying at runtime, wherein the fragment block is loaded into and retrieved from the SVE register when executing fragment processing instructions according to the SIMD approach.

2. The system of claim 1, wherein the graphics rendering pipeline includes vertex generation and vertex processing.

3. The system of claim 1, wherein the graphics rendering pipeline includes primitive generation and primitive processing.

4. The system of claim 1, wherein the graphics rendering pipeline includes fragment generation and fragment processing.

5. The system of claim 1, wherein the fragment processing includes texture sampling for coloring the fragments based on texture data stored in a texture buffer of the system.

6. The system of claim 1, wherein the fragment processing includes shader processing.

7. The system of claim 1, wherein the fragment processing includes blending a pixel output of the fragment processing with pixel data included in the frame buffer.

8. The system of claim 1, comprising a dynamic compiler configured to generate SVE code for execution by the CPU in performing the graphics rendering pipeline.

9. The system of claim 8, wherein the dynamic compiler is configured to generate the SVE code according to a Just In Time (JIT) approach.

10. The system of claim 8, wherein the dynamic compiler is configured to determine a number of data elements to include in the SVE register using a loop vectorization algorithm.

11. The system of claim 1, wherein the SVE register has a total bit width of T and the data elements have a bit length of p, wherein number of data bits stored in and retrieved from the SVE register is T/p rounded to a nearest integer number of data elements that will fit in the SVE register.

12. The system of claim 1, wherein the multiple data elements include fragments, vertices or primitives.

13. The system of claim 1, wherein the SVE register has a bit width of between 256 and 2048 bits.

14. A user device for rendering a 3D scene on a screen thereof, the user device comprising:

a central processing unit (CPU) including at least one hardware-implemented Scalable Vector Extension (SVE) register;

a frame buffer; and a non-transitory computer-readable medium storing instructions that, when executed by the CPU, are configured to:

receive 3D scene data representing the 3D scene;

process the 3D scene data through a graphics rendering pipeline in which graphics rendering instructions are executed in a Single Instruction, Multiple Data (SIMD) approach, wherein multiple data elements of the SIMD approach are stored in and retrieved from the SVE register; and store pixel data resulting from the graphics rendering pipeline in the frame buffer for output to the screen via a renderer;

wherein the graphics rendering pipeline includes fragment processing being performed on a fragment block of M*N fragments, wherein M and N are determined based on at least one of a bit width of the SVE register and a vector length of the SVE register, the vector length varying at runtime, wherein the fragment block is loaded into and retrieved from the SVE register when executing fragment processing instructions according to the SIMD approach.

15. The user device of claim 14, wherein the fragment processing includes at least one of:

texture sampling for coloring the fragments based on texture data stored in a texture buffer of the user device, shader processing, and blending a pixel output of the fragment processing with pixel data included in the frame buffer.

16. The user device of claim 14, comprising a dynamic compiler configured to generate SVE code for execution by the CPU in performing the graphics rendering pipeline.

17. The user device of claim 16, wherein the dynamic compiler is configured to determine a number of data elements to include in the SVE register using a loop vectorization algorithm.

18. A graphics rendering computer implemented method for rendering a 3D scene on a screen of a user device, the method comprising:

receiving, via a Central Processing Unit (CPU), 3D scene data representing the 3D scene;

processing, via the CPU, the 3D scene data through a graphics rendering pipeline in which graphics rendering instructions are executed in a Single Instruction, Multiple Data (SIMD) approach, wherein multiple data elements of the SIMD approach are stored in and retrieved from at least one hardware-implemented SVE register of the CPU; and storing pixel data resulting from the graphics rendering pipeline in a frame buffer for output to the screen via a renderer;

wherein the graphics rendering pipeline includes fragment processing being performed on a fragment block of M*N fragments, wherein M and N are determined based on at least one of a bit width of the SVE register and a vector length of the SVE register, the vector length varying at runtime, wherein the fragment block is loaded into and retrieved from the SVE register when executing fragment processing instructions according to the SIMD approach.

19. The method of claim 18, wherein the fragment processing comprises iteratively processing successive fragment blocks until all fragments associated with the 3D scene have been processed.

* * * * *